Feb. 18, 1947. J. HAJEK 2,415,877
BAND SAW APPARATUS
Filed Sept. 24, 1945 2 Sheets-Sheet 1
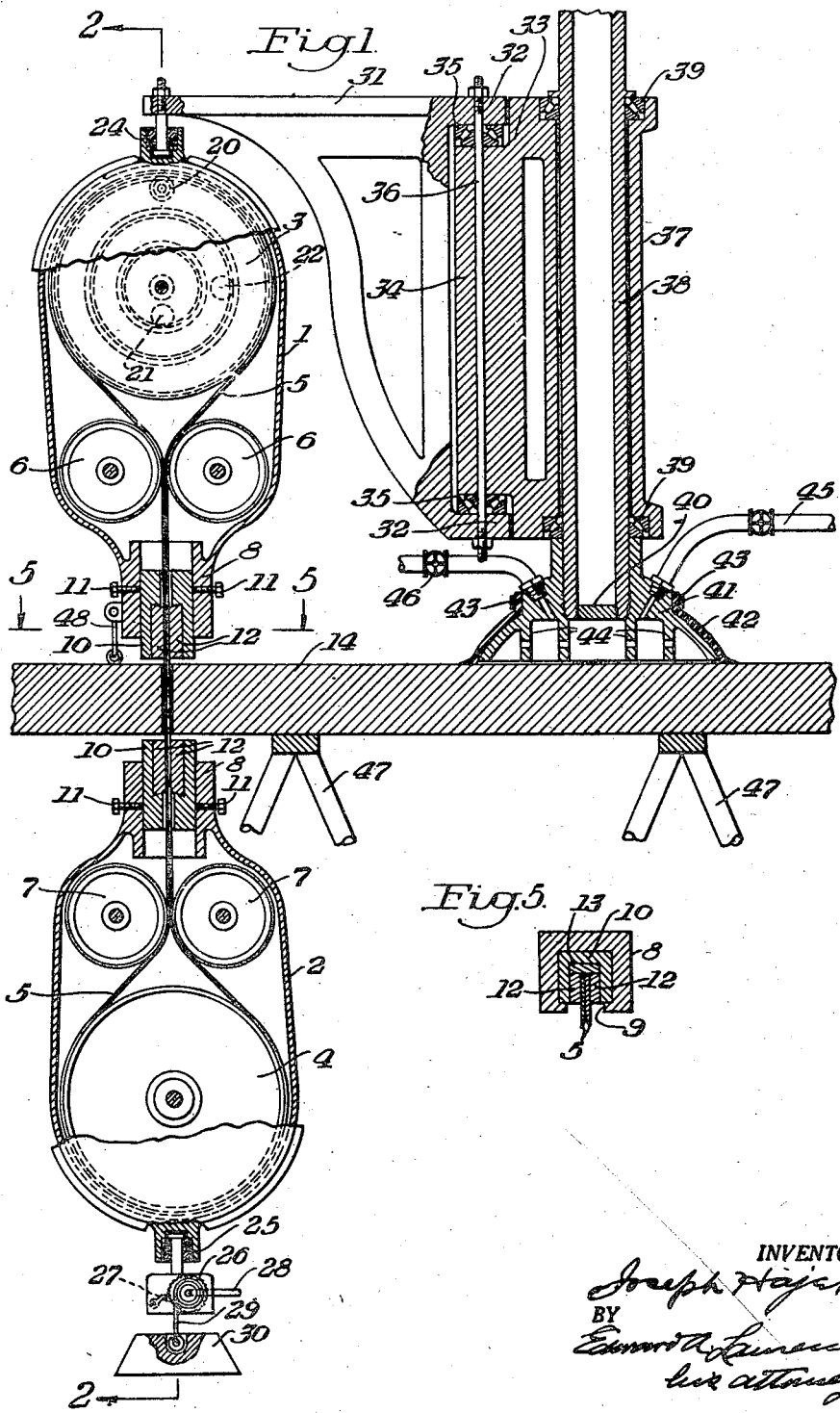
INVENTOR.
Joseph Hajek
BY
Edward R. Lawrence
his attorney Feb. 18, 1947. J. HAJEK 2,415,877
BAND SAW APPARATUS
Filed Sept. 24, 1945 2 Sheets-Sheet 2
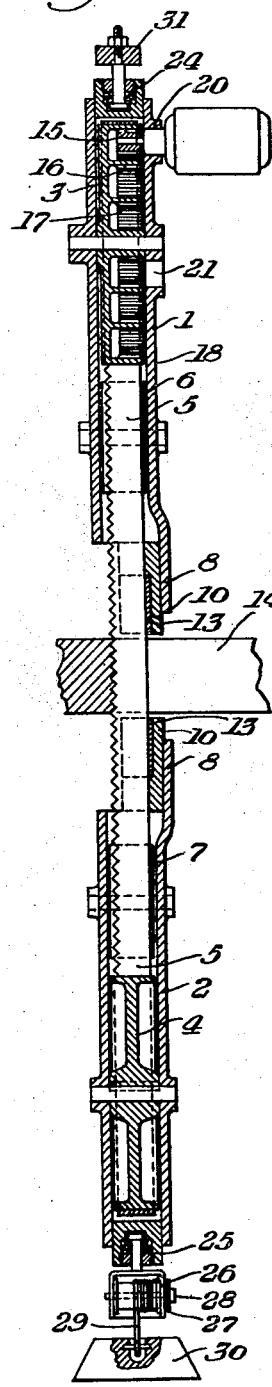
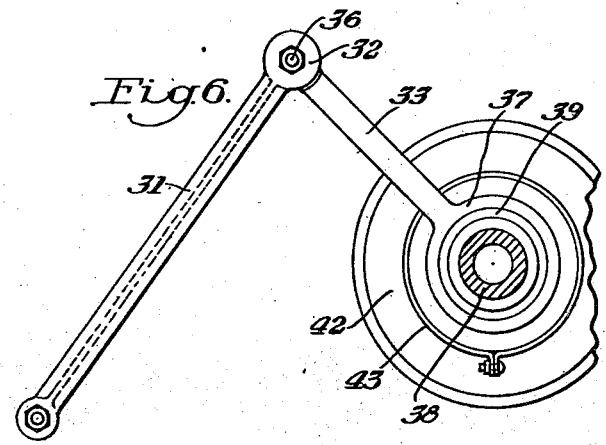
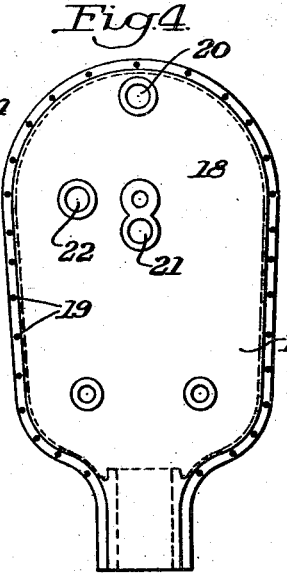
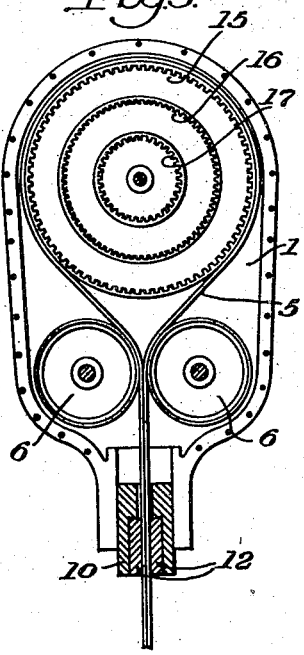
INVENTOR.
Joseph Hajek
BY Edward A. Lawrence,
his attorney Patented Feb. 18, 1947

2,415,877

UNITED STATES PATENT OFFICE 2,415,877

BAND SAW APPARATUS

Joseph Hajek, Mars, Pa.

Application September 24, 1945, Serial No. 618,204

12 Claims. (Cl. 143—21)

1

My invention relates to band saws, and consists in new and useful improvements in the same.

In the band saw art an endless saw band is being mounted on two spaced apart flight-reversing pulleys, at least one of which is power rotated, and opposed pairs of pulleys or rollers are employed to guide and maintain the two flights of the saw in sliding contact to obtain a single cut with a narrow kerf.

In the present practice a machine frame is employed upon which both sets of pulleys are mounted, and a work-table carried by the frame is used for supporting the work-piece, the work-piece being shifted on the table by the operator to direct the cut along the selected path.

Thus, in the present practice, the path of the cut is limited by the clearance afforded by the frame and the table for the movement of the work-piece. Where the work-piece is of large area and the selected path for the cut is extensive or irregular, it is impossible to complete the operation unless the work piece is removed from the table and reset thereon at more or less frequent intervals. Again, where the work-piece is heavy, it is difficult either to shift the work-piece relative to the table, as the operation progresses, or to move it with sufficient accuracy to obtain satisfactory results.

The principal object which I have in view is the provision of means whereby, notwithstanding the area or weight or size of the work-piece, or the irregularity or changes of direction of the selected path of the cut, the latter may be easily and accurated accomplished. I attain this purpose by so mounting the saw that it is moved by the operator relative to the work-piece which remains stationary.

Again I so mount the saw that it is suspended entirely from above, the upper pulleys being supported above the work-piece, and the lower pulleys being suspended beneath the work-piece by the saw-band which runs about the same.

To provide the proper flexibility in the movement of the saw band to enable it to accurately follow the selected path of cut, I support the upper set of pulleys from a stationary support by means of a jointed arm structure so that the operator may move and guide the saw band accurately along the selected path.

Again I so construct the jointed arm structure

2 and its support as a portable unitary assembly which may be readily mounted on the work-piece itself, and may be removed therefrom or shifted on the same as the operation proceeds.

Means are provided for regulating the speed of travel of the band saw.

Other objects in view and other improvements in structure and arrangement of parts will appear from the following description.

In the accompanying drawings wherein I have illustrated a practical embodiment of the principles of the present invention, Fig. 1 is a front elevation of the assembled band saw mechanism, the front walls of the upper and lower housings being partially broken away to expose new parts which otherwise would be concealed;

Fig. 2 is a sectional view taken along the dotted line 2—2 in Fig. 1;

Fig. 3 is a partial view showing the rear face of the upper flight-reversing pulley and the concentric ring gears mounted thereon for driving the same at different speeds, the removable rear wall of the upper housing being omitted;

Fig. 4 is a similar view but with the rear wall in place to show the several positions in which the motor may be mounted to provide for changes in speed;

Fig. 5 is a cross-sectional view, taken along the dotted line 5—5 in Fig. 1 and showing the method of detachably mounting the guide-blocks in place;

Fig. 6 is a view in plan of the jointed arm from which the saw assembly is supported from above.

Referring to the drawings, 1 and 2 indicate the upper and lower housings in which are journaled the upper and lower flight-reversing pulleys 3 and 4, respectively. 5 indicates the continuous or endless band saw having a series of cutting teeth along one edge of the same. The band saw is mounted on and runs about both the upper and lower pulleys, and its flights or intermediate straight portions between the two pulleys are directed into surface contact relation by means of the opposed pairs of pulleys 6 and 7, which pulleys are also journaled by their axles between the side walls of the housings 1 and 2 respectively.

At the lower end of the upper housing 1 and the upper end of the lower housing 2, the edge walls of the housings converge to form the vertically disposed open ended rectangular sockets 8 having their front walls provided with vertical slots 9 to provide clearance for the toothed edges of the oppositely traveling flights of the saw band 5.

10 indicates three-sided carriers vertically slidable in the sockets 8 and secured at the desired elevation by any convenient means, such, for instance, as the set screws 11. The interior side walls of the carriers 10 are provided with seats in which are mounted the opposed guide blocks 12, which blocks are spaced apart sufficiently to provide an open slot in which the flights are held in sliding surface contact. 13 indicates a back block secured against the inner rear wall of the carrier against which the plain or untoothed edges of the flights bear. Thus an open front guide groove is provided for the flights, the toothed edges of the flights being exposed by the slot 9 in the socket 8.

The blocks 12 and 13 preferably are formed of some hard wear-resisting metal alloy, and they may be brazed or otherwise held in place in the carrier. The guide slot mechanism may readily be removed from and replaced in the sockets.

The carriers are vertically adjustable in the sockets so that the guides may be positioned closely to the upper and lower surfaces of the work-piece 14, the thickness of which varies for different jobs.

The upper flight-reversing pulley 3 is power-rotated to drive the saw band, and preferably provision is made for imparting various speeds of travel thereto, depending upon the material of the work-piece to be cut, hard materials such as high carbon and like steels requiring lower speeds than those practical in softer materials such as aluminum or plyboard.

Thus, as indicated in Fig. 3, I provide the rear face of the upper flight-reversing pulley 3 with a plurality of concentrically positioned ring gears, shown as three in number and indicated as 15, 16 and 17 respectively, thereby providing for three speeds of travel for the saw band 5.

The rear wall 18 of the upper housing may be in the form of a removable lid detachably held in position as by cap screws 19, and said lid is provided with a plurality of ports 20, 21 and 22, equal in number to that of the ring gears and so positioned that when the bearing collar of a portable electric motor 23 is inserted into the proper port a spur pinion on the end of the motor shaft will mesh with the corresponding ring gear carried by the flight-reversing pulley 3. Any suitable means may be provided to lock the motor temporarily in place.

The saw assembly is supported from above by means of the upper housing 1 which is suspended by a swivel bolt mechanism 24 from the free end of a jointed arm structure later to be described.

Suspended by means of a swivel mechanism 25 from the lower end of the lower housing 2 is a winch 26 provided with a ratchet 27, and the protruding end of the winch shaft is squared for the application of a crank 28 or other tool.

29 indicates a cable wound about the winch and provided at its free end with a hook to be attached to a weight 30 which is thus suspended from the lower housing and exerts sufficient tension on the band saw to hold it properly aligned. The weight may be changed to provide the required tension.

The swivel mechanism 24, from which the saw assembly is suspended is itself suspended from the free end of a jointed arm structure, thus providing free movement of the saw assembly in making either a straight, a curved or a tortuous cut in the workpiece 14. This jointed arm structure advantageously may be of the following character.

31 is a bracket from the outer or free end of which the swivel mechanism 24 is suspended. This bracket is preferably substantially of the triangular shape illustrated to provide clearance for the saw assembly, and it is provided at its rear or vertical edge with a pair of outwardly projecting upper and lower hinge lugs 32 having aligned bolt holes.

33 indicates a wing plate having parallel vertical edges. The outer edge, the left in Fig. 1, is provided with a vertical tubular sleeve 34 of proper length to be inserted between the lugs 32 of the bracket 31 with antifriction bearings 35 interposed between the sleeve and the lugs. 36 indicates a stay bolt extending through the lugs and the sleeve to maintain the bracket 31 and the wing plate 33 in hinged relation.

The other vertical edge of the wing plate 33 is provided with a second vertical sleeve 37 which is journaled on the vertical post 38 with interposed antifriction bearings 39, thus hingedly supporting the wing plate on the post.

The post 38 may be a permanent element in fixed position, but I prefer to arrange the same for positioning as required directly on the workpiece 14 itself, as illustrated in Fig. 1, and securing it in such manner that it may be moved on the work-piece when desired. In such case, as the center of gravity of the band saw is off center relative to the post, to provide a rigid attachment to the work-piece for the post, I prefer to mount the post on a suction base which, when the pressure is reduced therein to the partial vacuum necessary, will be firmly attached to the work-piece so as to remain under load in its vertical position.

Thus I close the lower end of the post 39 by means of the threaded plate 40 and screw the threaded lower end of the post into the central opening of the base plate 41. The base 41 is domed substantially as shown having an annular outer edge which fits flat on the surface of the work piece. An annular skirt 42 of rubber or similar flexible material encircles the outer wall of the base and is held thereto as by the metal band 43. The lower edge of the skirt 42 is beveled to fit flat on the surface of the work-piece and seal the lower edge of the domed base against the inward leakage of air.

To strengthen the base plate I prefer to provide it with one or more annular internal ribs 44 which are provided with perforations for the passage of air therethrough.

Any suitable means are provided for exhausting the air from the interior of the domed base, such as the host 45 connected to a port in the upper wall of the base plate and at its other end to a suction apparatus by means of which the necessary degree of partial vacuum may be maintained in the interior of the base plate.

When the post has been placed in proper position on the work-piece suction is applied to provide the necessary grip to exhaust the air and cause adhesion of the base plate to the work.

I also provide the base plate with a second port provided with a valve 46 which may be opened to admit air to the base plate and release the post from its attachment to the work-piece when the job has been completed or it is desired to shift the saw assembly as a unit on the work-piece.

The work-piece 14 may be supported in position by any convenient means such as the horses 47.

To prevent the saw assembly from tipping in case the vacuum grip is relieved, as in shifting the saw assembly relative to the work-piece, I provide a leg 48 hinged to the upper socket 8 and which may be swung down into a vertical position to engage the work and support the saw assembly in position. I provide the lower end of the leg with a roller so that the saw assembly may be easily shifted on the work-piece.

The advantages of my present invention are numerous, as will be evident to one skilled in the art. Among them are the following.

My invention makes possible the cutting of any selected design or contour of path in a work-piece of any dimension, such as a sheet or plate of steel, aluminum or any other character of metal or plyboard or any other material, and this operation may be accomplished with great accuracy and speed, inasmuch as the work-piece may remain stationary and the saw assembly may be moved as required.

The workman by seizing the upper guide socket may easily direct the kerf in the material of the work-piece to provide the proper direction of cut.

The upper and lower housings, pulleys and guide blocks are preferably identical, and thus the manufacturing costs are reduced. The housings and pulleys advantageously may be made of aluminum, magnesium or other light material, and in the case of small assemblies may be stampings.

By means of the plurality of ring gears concentrically mounted on the upper flight-reversing pulley I am enabled to vary the rotative power exerted on the pulley, and where a constant speed motor is employed I may thus change the speed of the saw to suit the character of the work-piece. Again in case a variable speed motor is used by meshing its spur gear with the proper ring gear I can obtain a wide range of speed selection.

By the use of a post or supporting member which may be temporarily mounted at any convenient location, the entire saw assembly is capable of being brought into the proper relation to the work-piece, and the entire assembly may be supported on the work-piece and shifted into different positions thereon as may be desired. This portability of the saw assembly relative to the work-piece enables me to reduce the size and length of the jointed arm which would be impossible were the assembly supported from a fixed position. It is to be noted that a relatively short arm would be less liable to vibration and swaying movements.

The flights of the band saw moving in opposite directions and in sliding contact balance each other and guide blocks may be adjusted to close proximity to the upper and lower surfaces of the work-piece thus holding the cut accurately in its path.

I claim:

1. In saw apparatus, the combination of a band saw, an upper flight-reversing pulley over which the saw runs and by which the saw is suspended, means for imparting rotary motion to said pulley, a lower flight-reversing pulley about which the saw runs and which is suspended entirely by the saw, and means for causing the flight portions of the saw intermediate of the pulleys to travel in sliding surface contact to cut a single kerf in a work-piece.

2. In saw apparatus, the combination of a band saw, an upper flight-reversing pulley over which the saw runs and by which the saw is suspended, swivel means for suspending said pulley from above, means for imparting rotary motion to said pulley, a lower flight-reversing pulley about which the saw runs and which is suspended entirely by the saw, and means for causing the flight portions of the saw to travel in sliding contact with each other to cut a single kerf in a work-piece.

3. The structure of claim 1 characterized by the provision of means to regulate the tension exerted on the flights of the saw.

4. The structure of claim 2 characterized by the provision of means to regulate the tension exerted on the flights of the saw.

5. The structure of claim 1 characterized by the provision of means for shifting the upper pulley in a plane transverse to that of the flights of the saw to vary the direction of the path of the cut in a work-piece.

6. The structure of claim 2 characterized by the provision of means for shifting the upper pulley in a plane transverse to that of the flights of the saw to vary the direction of the path of the cut in a work-piece.

7. In sawing apparatus, the combination of a band saw, an upper flight-reversing pulley, over which the saw runs and by which the saw is suspended, means for imparting rotary motion to the pulley, a lower flight-reversing pulley about which the saw runs and which is suspended entirely by the saw, means for causing the flight portions of the saw intermediate of the pulleys to travel in sliding surface contact, a support, and a jointed arm structure swingingly attached at one end to the support and from the other end of which the upper pulley is suspended.

8. The structure of claim 7 characterized by the provision of a swivel connection between the upper pulley and the end of the jointed arm structure.

9. The structure of claim 7 characterized by the provision of a jointed arm structure comprising a bracket from the outer end of which the upper pulley is suspended and a member to which the bracket is hingedly attached and which is hingedly connected to the support.

10. In a portable band saw mechanism, the combination of a support adapted to be mounted on a supporting surface such as the work-piece to be sawed, a jointed arm structure having one end hingedly connected to the support, an upper flight-reversing pulley suspended from the other end of the jointed arm structure, means for imparting rotary motion to said pulley, a band saw running over said pulley and suspended therefrom, a second flight-reversing pulley about which the saw runs and which is suspended entirely by the saw, and means for causing the flight portions of the saw intermediate of the pulleys to travel in sliding surface contact to cut a single kerf.

11. In a portable band saw mechanism, the combination of a support adapted to be mounted on a supporting surface such as the work-piece to be sawed, a suction grip base for the support arranged to maintain the support in position on the supporting surface, a jointed arm structure having one end hingedly connected to the support, an upper flight-reversing pulley suspended from the other end of the jointed arm structure, means for imparting rotary motion to said pulley, a band saw running over said pulley and suspended therefrom, a second flight-reversing pulley about which the saw runs and which is suspended entirely by the saw, and means for causing the flight portions of the saw intermediate of the pulleys to travel in sliding surface contact to cut a single kerf.

12. The structure of claim 10 characterized by the provision of a swivel connection between the jointed arm structure and the first mentioned pulley.

JOSEPH HAJEK.

REFERENCES CITED

The following references are of record in the file of this patent:

UNITED STATES PATENTS

| Number | Name | Date |
|---|---|---|
| 184,552 | Smith | Nov. 21, 1876 |
| 308,188 | Miller | Nov. 18, 1884 |
| 822,056 | Knox | May 29, 1906 |
| 1,710,970 | de Northall | Apr. 30, 1929 |

FOREIGN PATENTS

| Number | Country | Date |
|---|---|---|
| 425,154 | French | Mar. 29, 1911 |
| 96,798 | German | Apr. 16, 1898 |